(12) United States Patent
Erkmen et al.

(10) Patent No.: US 11,888,530 B2
(45) Date of Patent: Jan. 30, 2024

(54) OPTICAL TRACKING MODULE CHIP FOR WIRELESS OPTICAL COMMUNICATION TERMINAL

(71) Applicant: X DEVELOPMENT LLC, Mountain View, CA (US)

(72) Inventors: Baris Ibrahim Erkmen, Sunnyvale, CA (US); Devin Brinkley, Redwood City, CA (US); Eric Teller, Palo Alto, CA (US); Thomas Moore, Menlo Park, CA (US); Jean-Laurent Plateau, San Jose, CA (US)

(73) Assignee: X DEVELOPMENT LLC, Mountain View, CA (US)

( * ) Notice: Subject to any disclaimer, the term of this patent is extended or adjusted under 35 U.S.C. 154(b) by 37 days.

(21) Appl. No.: 17/698,224

(22) Filed: Mar. 18, 2022

(65) Prior Publication Data

US 2023/0088334 A1    Mar. 23, 2023

Related U.S. Application Data

(60) Provisional application No. 63/246,599, filed on Sep. 21, 2021, provisional application No. 63/246,605, filed on Sep. 21, 2021.

(51) Int. Cl.
*H04B 10/61* (2013.01)
*G01S 7/481* (2006.01)
(Continued)

(52) U.S. Cl.
CPC .......... *H04B 10/614* (2013.01); *G01S 7/4817* (2013.01); *G01S 17/66* (2013.01); *G02B 27/0087* (2013.01); *G02F 1/292* (2013.01)

(58) Field of Classification Search
CPC ..... H04B 10/614; G01S 7/4817; G01S 17/66; G02B 27/0087; G02F 1/292
(Continued)

(56) References Cited

U.S. PATENT DOCUMENTS

| 5,543,805 A | 8/1996 | Thaniyavarn |
| 6,978,093 B2 | 12/2005 | Clark |

(Continued)

FOREIGN PATENT DOCUMENTS

EP    0546811 A1    6/1993

OTHER PUBLICATIONS

International Search Report and Written Opinion for Application No. PCT/US2022/032348 dated Sep. 29, 2022 (11 pages).

(Continued)

*Primary Examiner* — Dalzid E Singh
(74) *Attorney, Agent, or Firm* — Botos Churchill IP Law LLP

(57) ABSTRACT

The optical tracking module includes an optical phased array (OPA), an analog drive, an integrated photodetector, and one or more processors. The OPA includes a plurality of array elements, and a plurality of phase shifters. The analog drive is configured to adjust the plurality of phase shifters. The integrated photodetector is configured to receive light from the OPA. The one or more processors is configured to extract signal information of an incoming beam via the OPA, and control an outgoing beam using the analog drive based on the signal information. The OPA, the analog drive, the integrated photodetector and the one or more processors are in an integrated circuit.

20 Claims, 9 Drawing Sheets

(51) Int. Cl.
  *G02F 1/29* (2006.01)
  *G02B 27/00* (2006.01)
  *G01S 17/66* (2006.01)
(58) Field of Classification Search
  USPC .......................................................... 398/208
  See application file for complete search history.

(56) References Cited

U.S. PATENT DOCUMENTS

| | | | |
|---|---|---|---|
| 8,605,761 | B2 | 12/2013 | Hutchin |
| 9,683,928 | B2 | 6/2017 | Swanson |
| 10,678,117 | B2 | 6/2020 | Shin et al. |
| 11,003,045 | B2 | 5/2021 | Hosseini et al. |
| 2017/0357142 | A1* | 12/2017 | Spector .................. G02B 27/30 |
| 2018/0039153 | A1 | 2/2018 | Hashemi et al. |
| 2018/0102847 | A1 | 4/2018 | Kim et al. |
| 2018/0321569 | A1 | 11/2018 | Spector et al. |
| 2020/0192179 | A1* | 6/2020 | Hajimiri ............ G02B 6/29313 |
| 2020/0319524 | A1 | 10/2020 | Hosseini et al. |
| 2021/0103199 | A1* | 4/2021 | Wu ........................ G01S 7/4818 |
| 2021/0152243 | A1* | 5/2021 | Hosseini .............. H04B 10/112 |
| 2022/0146903 | A1* | 5/2022 | Watts .................... G01S 7/4817 |
| 2022/0252908 | A1 | 8/2022 | Inamdar et al. |

OTHER PUBLICATIONS

Bazil Raj, Arockia A, et al., "Intensity feedback-based beam wandering mitigation in free-space optical communication using neural control technique", EURASIP Journal on Wireless Communications and Networking 2014, 160 (2014).

Doylend, J. K., et al., "Two-dimensional free-space beam steering with an optical phased array on silicon-on-insulator", Optical Society of America. 2011.

Guo, Yongjun, et al., "Integrated Optical Phased Arrays for Beam Forming and Steering.", Appl. Sci. 2021, 11, 4017. https://doi.org/10.3390/app11094017, pp. 1-41.

Hahn, Daniel V., et al., The Johns Hopkins APL Technical Digest, vol. 30, No. 4., 2012, 321-330.

Kwong, David, et al., "On-chip silicon optical phased array for two-dimensional beam steering", Optics letters 39 4 (2014): 941-4.

Leitgeb, E., et al., "Optical networks, last mile access and applications", Journal of Optical Fiber Communications Reports 2, Springer Science+Business Media Inc., 2005, 56-85.

Liu, Yaqi, et al., "A single-chip multi-beam steering optical phased array: design rules and simulations", Optics Express vol. 29, Issue 5, pp. 7049-7059 (2021).

Ramasarma, Vaidyanathan, "Free Space Optics: A Viable Last-Mile Solution", Bechtel Telecommunications Technical Journal, vol. 1, No. 1., Dec. 2002, 1-9.

Stepanova, Daria, et al., "Developing A Highly Accurate Pointing System for Free Space optical Communications", Journal of Communications vol. 14, No. 12, Dec. 2019.

Wang, Pengfei, et al., "Design and fabrication of a SiN—Si dual-layer optical phased array chip", Photonics Research vol. 8, No. 6, pp. 912-919 (Jun. 2020).

Zhang, Haiyang, et al., "Fast beam steering enabled by a chip-scale optical phased array with 8×8 elements", Optics Communications, vol. 461, 2020, 125267, ISSN 0030-4018.

International Search Report and Written Opinion for Application No. PCT/US2022/041180 dated Dec. 8, 2022 (14 pages).

International Search Report and Written Opinion for Application No. PCT/US2022/042025 dated Dec. 9, 2022 (14 pages).

Abediasl, Hooman, et al., "Monolithic optical phased-array transceiver in a standard SOI CMOS process" Optics Express, vol. 23, No. 5, Mar. 2, 2015, p. 6509, XP055497279, DOI: 10.1364/OE.23.006509.

\* cited by examiner

200

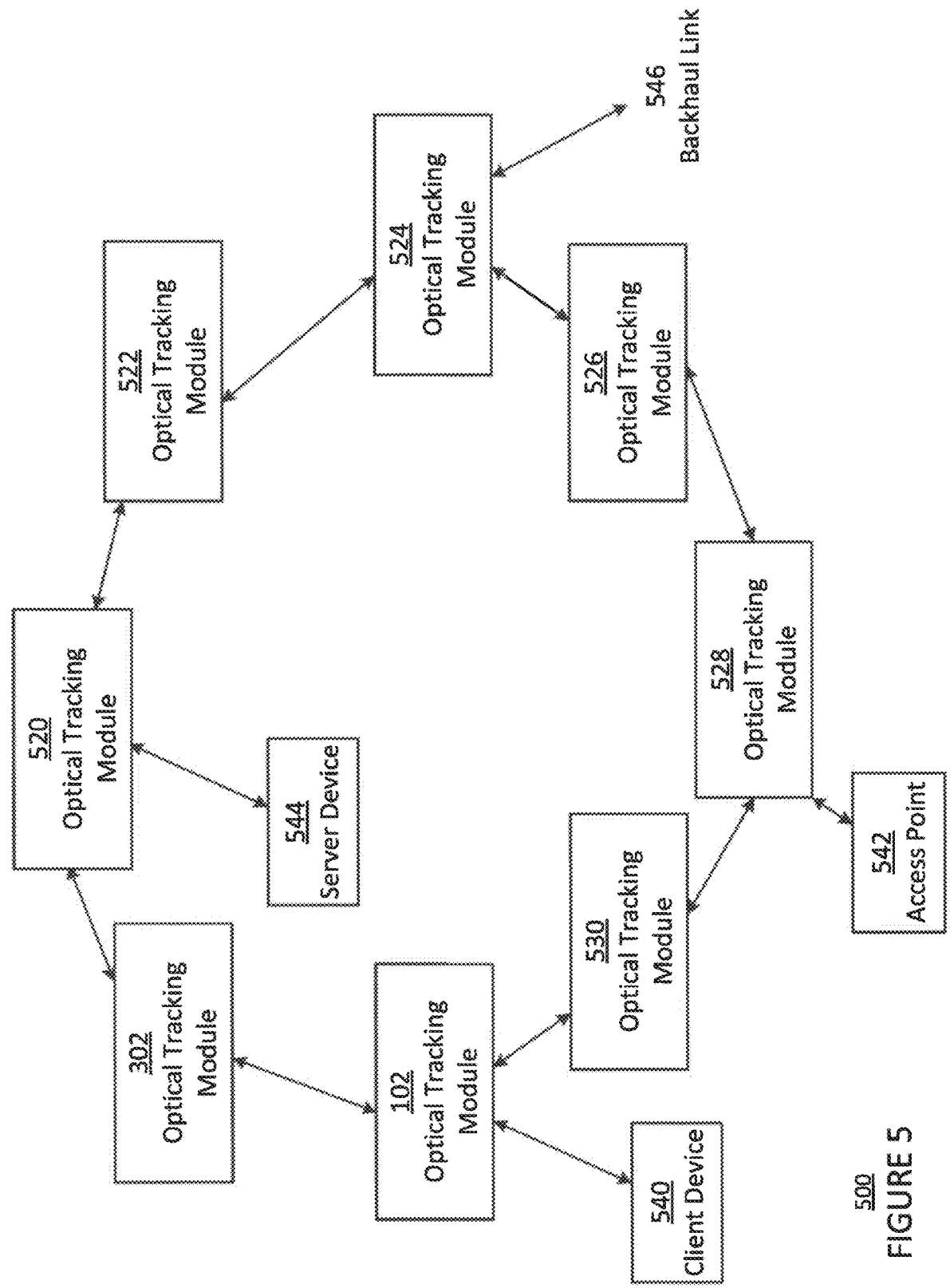

OPTICAL TRACKING MODULE CHIP FOR WIRELESS OPTICAL COMMUNICATION TERMINAL

CROSS REFERENCE TO RELATED APPLICATIONS

The present application claims the benefit of U.S. Provisional Application No. 63/246,605, filed Sep. 21, 2021. The present application also claims the benefit of U.S. Provisional Application No. 63/246,599, filed Sep. 21, 2021. The entire disclosures of these applications are incorporated by reference herein.

BACKGROUND

Wireless optical communication enables high-throughput and long-range communication, in part due to high gain offered by the narrow angular width of the transmitted beam. However, the narrow beam also requires that it must be accurately and actively pointed in order to remain aligned to the terminal aperture at the remote end. This pointing may be accomplished by small mirrors (e.g., MEMS or voice-coil based fast-steering mirror mechanisms) that are actuated to steer the beam. In other implementations, electro-optic steering of beams with no moving parts is used to steer the beam, which provides cost, lifetime and performance advantages. Optical Phased Arrays (OPAs) are a critical technology component, with added benefits on adaptive-optics, point-to-multipoint support, and mesh network topologies. Each active element in the OPA requires electro-optic phase shifting capability.

BRIEF SUMMARY

Aspects of the disclosure provide for a free-space optical communication system, namely an optical tracking module. The optical tracking module includes an optical phased array (OPA), an analog drive, an integrated photodetector, and one or more processors. The OPA includes a plurality of array elements, and a plurality of phase shifters. The analog drive is configured to adjust the plurality of phase shifters. The integrated photodetector is configured to receive light from the OPA. The one or more processors is configured to extract signal information of an incoming beam via the OPA, and control an outgoing beam using the analog drive based on the signal information. The OPA, the analog drive, the integrated photodetector and the one or more processors are in an integrated circuit.

In one example, the optical tracking module is configured to connect to a modem via one or more fibers. In this example, the optical tracking module optionally includes a circulator that includes a first port configured to receive a signal from a first fiber, a second port configured to transmit a signal to and receive a signal from the integrated circuit, and a third port configured to transmit a signal to a second fiber. In another example, the optical tracking module includes a voltage regulator. In this example, the voltage regulator is optionally configured to provide power to the integrated circuit.

In a further example, the optical tracking module is configured to communicate telemetry data to one or more separate processors that are external to the optical tracking module. In yet another example, the optical tracking module is configured to connect to a separate optical lens assembly that increases aperture gain. In this example, the optical tracking module is also optionally configured to connect to a separate transceiver module that includes one or more transceivers and one or more amplifiers. In a still further example, the optical tracking module is less than 300 $cm^3$ in volume. In this example, the optical tracking module is optionally less than 100 $cm^2$ in surface area on any face.

In another example, the plurality of array elements is in a 32×32 arrangement. In a further example, the analog drive includes a digital-to-analog converter (DAC) and an amplifier; wherein the one or more processors are connected to the DAC; wherein the DAC is also connected to the amplifier; and wherein the amplifier is also connected to the OPA. In yet another example, the integrated photodetector is connected to the one or more processors via an amplifier and an analog-to-digital converter (ADC).

Other aspects of the disclosure provide for a system that includes a plurality of communication terminals in a network arrangement including a plurality of point-to-point relay links. Each of the plurality of communication terminals includes an optical tracking module that has an optical phased array (OPA) including a plurality of array elements, and a plurality of phase shifters; an analog drive configured to adjust the plurality of phase shifters; an integrated photodetector configured to receive light from the OPA; and one or more processors configured to extract signal information of an incoming beam via the OPA, and control an outgoing beam using the analog drive based on the signal information; and wherein each of the plurality of communication terminals is lensless apart from the OPA.

In one example, each communication terminal of the plurality of communication terminals is positioned 100 meters or less from another communication terminal of the plurality of communication terminals; and wherein each communication terminal of the plurality of communication terminals has at least 10 Gbps throughput to another communication terminal of the plurality of communication terminal. In another example, the network arrangement also includes one or more point-to-multipoint links. In a further example, the network arrangement at least partially includes a mesh arrangement. In yet another example, the network arrangement at least partially includes a ring arrangement. In a still further example, the plurality of point-to-point relay links includes at least one inter-building link.

Further aspects of the disclosure provide for a method for controlling an optical phased array. The method includes receiving a first optical communication beam at the optical phased array in an integrated circuit; receiving the first optical communication beam at a photodetector in the integrated circuit; generating, at the photodetector, a first signal based on the first optical communication beam; determining, by one or more processors in the integrated circuit, signal information of the first optical communication beam according to the first signal; sending, by the one or more processors, a second signal to adjust one or more phase shifters in the integrated circuit based on the determined signal information; and transmitting a second optical communication beam using the optical phased array and the one or more phase shifters.

BRIEF DESCRIPTION OF THE DRAWINGS

FIG. 5 is a block diagram of a network in accordance with aspects of the disclosure.

DETAILED DESCRIPTION

Overview

Figure 1:
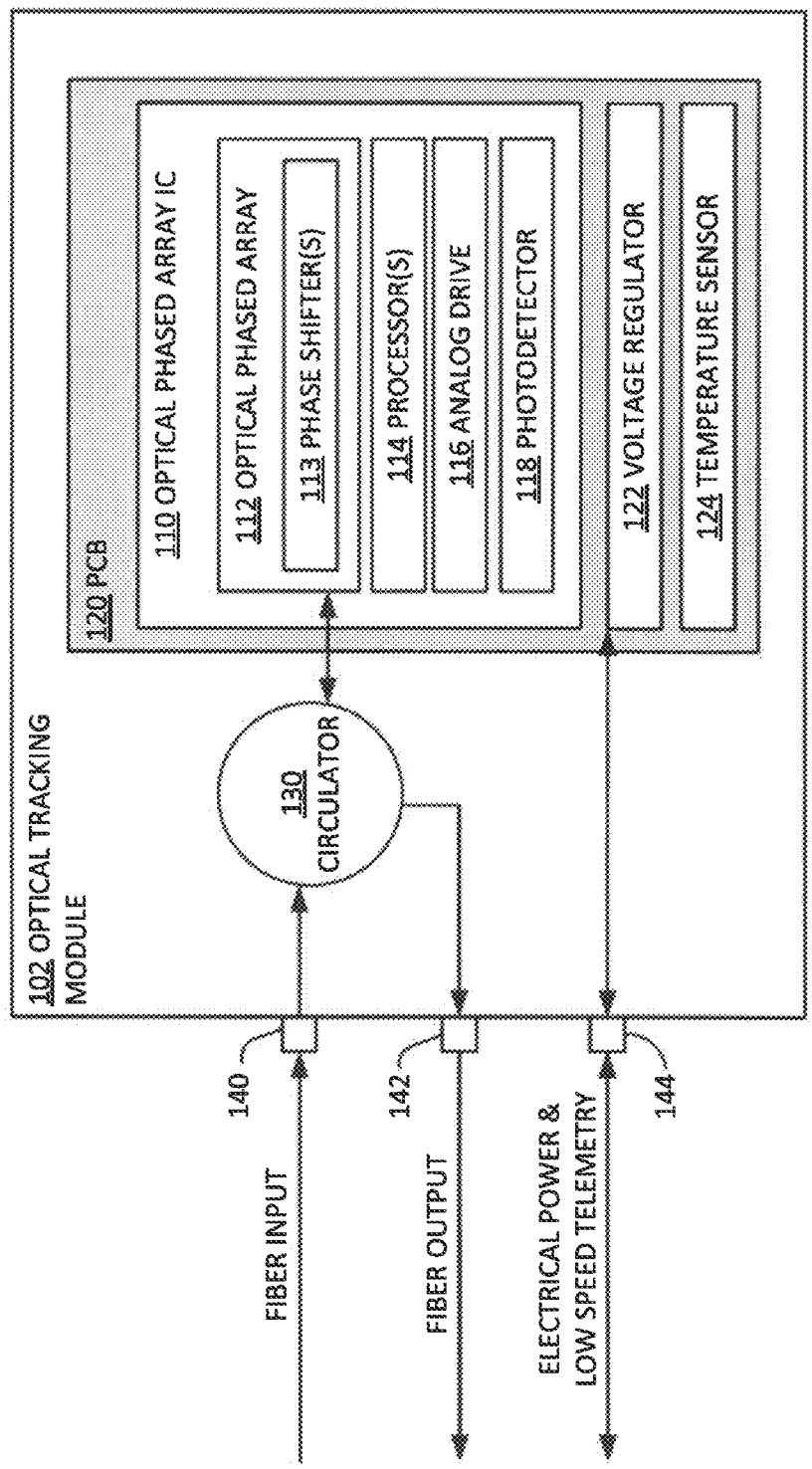
FIG. 1 is a block diagram 100 of an optical tracking module in accordance with aspects of the disclosure.

The technology relates to an optical tracking module for a wireless optical communication terminal that can be integrated on one or more photonic integrated chips. The optical tracking module may be configured for short-range, "last mile" network connections. For example, the optical tracking module may perform beam control and wavefront extraction without any moving parts. In addition, the tracking module may be used in a larger optical communication system that includes a separate optical assembly, transceiver module, and/or modem.

The optical tracking module may include an optical phased array (OPA) that provides photonic beam control of an outgoing beam. In particular, the OPA may be designed with a limited number of array elements, such as less than 64 elements, to achieve a more compact module while remaining capable of performing corrections described herein. The OPA may include a plurality of phase shifters configured to control signals received by and transmitted from the array elements of the OPA. The OPA may also include a single-path, fully reciprocal optical design that is configured to connect to a transceiver module for receiving and transmitting an optical beam, which allows for bidirectional communication via the OPA. The optical tracking module may also include one or more processors, such as an application specific integrated circuit (ASIC) or other hardware-based processor, that are configured to extract signal information of a beam incoming from free space via the OPA and provide drive for controlling a beam outgoing from free space via the OPA.

For controlling the outgoing beam, the optical tracking module may include an integrated photodetector, signal processing components, and an analog drive. The one or more processors may use the photodetector and the signal processing components to detect and/or determine pointing information related to an incoming beam. The analog drive is configured to steer the outgoing beam without any physically moving parts. For example, the analog drive may be configured to drive the phase shifters in the OPA to electronically steer the outgoing beam. The electronic steering may be for tip and tilt of the outgoing beam. The one or more processors may control the analog drive according to the pointing information, which may be provided in a feedback loop.

The optical tracking module may also be configured to extract wavefront information using the photodetector and the signal processing components. The extracted wavefront information may include tip and tilt terms, as well as higher order terms associated with an estimated angle of arrival or other variations in the incoming beam. For example, variations in the beam may be caused by environmental disturbances, atmospheric turbulence, or other external factors.

The configuration of the optical tracking module may allow for a low-cost and compact design. For example, the face of the optical tracking module may be less than 100 $cm^2$, and the depth of the optical tracking module may be less than 3 cm.

The optical tracking module may be used in an overall system architecture for a larger optical communication system that includes an optical assembly, a transceiver module, and a modem. The optical assembly may include telescope optics to increase aperture gain and a steerable mirror to maintain a target beam-steering range. The transceiver module may include photonics such as filters, multiplexers, demultiplexers, optical amplifiers, variable optical attenuators, and electronic circuitry. The components of the transceiver module may be integrated on a single chip. The transceiver chip is configured to receive and process optical beams being received by and transmitted from the larger optical communication system. The modem may include an adaptive rate modem with integrated switching capabilities for traffic aggregation and disaggregation. In some implementations, the transceiver module may be part of the modem.

When used as a terminal or node in itself without additional optics or steering, the optical tracking module is able to be used in last-mile topology that reduces electromagnetic interference and increases ease of scalability. For example, the last-mile topology may include a relay of point-to-point links that is configured to distribute data capacity in a "fiber-like" configuration. Each of the point-to-point links may be short-range, such as less than or equal to 100 meters, and high throughput, such as 10 Gbps or more, which may provide a higher availability. For example, the higher availability may be 99% availability or higher. The links may be positioned along roadways, which form natural paths in highly populated areas. In other examples, the last-mile topology may include a point-to-multipoint configuration from a transmitting location on a first building to a plurality of receiving locations on one or more buildings across the street from the first building. The point-to-multipoint configuration can be accomplished by time division of pointing between multiple links or beam-forming. At a building, the network may be extended using inter-building wireless or fiber links.

The features described herein enables efficient distribution of a large network capacity into the "last mile" of connectivity, which overcomes the capacity bottlenecks that typically limit radio-frequency wireless distribution and the cost of fixed fiber infrastructures. The use of the optical tracking module in a short-range, point-to-point/multi-point relay arrangement may avoid logistical issues common to deploying fiber, reduce the interference between links, and allow for higher throughput. The compact size of the optical tracking module may allow for less costly and more rapid deployment, as well as allow for ease of adjustment or update to the position of the optical tracking module. Given the characteristics of the output from the optical tracking module described herein, the links in a short-range arrangement may be more robust to motion of a mounting structure or to environmental factors.

Example Systems

Figure 2:
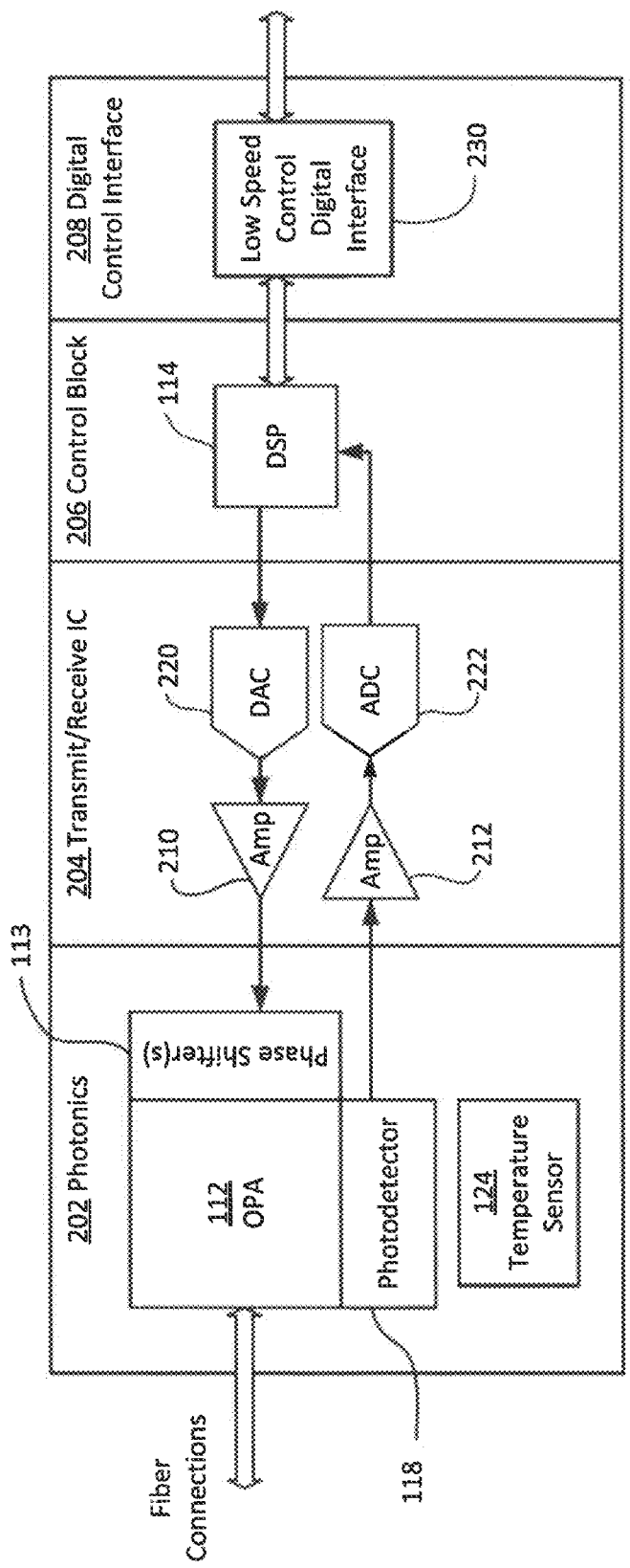
FIG. 2 is a functional flow diagram 200 of an optical tracking module in accordance with aspects of the disclosure.

FIG. 1 is a block diagram 100 of an optical tracking module 102 that may be used for short-range, high throughput optical communication links. In addition, FIG. 2 is a functional flow diagram 200 of the optical tracking module 102. The optical tracking module may include an optical phased array, one or more processors, an analog drive, and a photodetector. These components may be part of an integrated circuit or be discrete parts connected to receive an incoming optical beam, process the incoming optical beam, and transmit an outgoing beam. The configuration of the optical tracking module may allow for a low-cost and compact design. For example, the face of the optical tracking module may be less than 100 cm$^2$, and the depth of the optical tracking module may be less than 3 cm.

As shown in FIG. 1, the optical tracking module 102 includes an optical phased array (OPA) 112 that provides photonic beam control of an outgoing beam. The OPA may be a microlens array. The plurality of array elements of the OPA 112 may be arranged in a grid pattern with a consistent pitch, or distance, between adjacent elements. In addition, the OPA 112 may have a limited number of array elements, such as a 32×32 optical array or smaller. In other examples, the array elements may be in different arrangements having different numbers of rows and columns, different shapes, and/or different pitch (consistent or inconsistent).

The OPA 112 includes a plurality of phase shifters 113 configured to control signals received by and transmitted from the array elements of the OPA 112. The phase shifters 113 alter incoming and/or outgoing light. For example, the phase shifters may be architected to provide adjustment of amplitude and/or phase for each one or more outgoing beams. The adjustment provided by the phase shifters may allow for multi-beam forming and point-to-multipoint communication. Additionally or alternatively, high-bandwidth phase shifter technologies may be used to enable rapid jumping between adjacent links in point-to-multipoint communication. The incoming light is provided to the photodetector, and the outgoing light is provided to the array elements of the OPA 112. The architecture for the plurality of phase shifters may include at least one layer of phase shifters having one phase shifter connected to each array element in the plurality of array elements. In some examples, the phase shifter architecture includes a plurality of layers of phase shifters, where phase shifters in a first layer may be connected in series with one or more phase shifters in a second layer. Each phase shifter in the layer closest to the light source may also be connected to a photodetector.

The output from two or more phase shifters may be combined using a combiner. Using one or more combiners narrows the incoming optical beam. The one or more combiners may be a 2×2 MMI or a directional coupler. For example, a given combiner may receive two incoming beam portions from a first photodetector at a first input and from a second photodetector at a second input, and merge the beams into an output beam. The output beam may be directed to a photodetector, an edge coupler and/or another combiner. In particular, an out-of-phase portion of the output beam may be directed to a photodetector, and the remaining portion of the output beam may be directed to an edge coupler or another combiner. The edge coupler may direct the remaining portion of the output beam to an optical fiber for photonic processing.

In addition, the OPA 112 may be configured to receive light from one or more transmitter components and output the light as a coherent communication beam to be received by a remote communication system. The OPA 112 may also be to receive light from free space, such as a communication beam from second communication system, and provides the light to one or more receiver components. For example, the components of the OPA may provide the necessary photonic processing to combine an incoming optical beam into a single-mode waveguide that directs the beam out from the optical tracking module, such as to a separate transceiver module or modem. The OPA 112 may include a single-path, fully reciprocal optical design that is configured to connect to a separate transceiver module for receiving and transmitting an optical beam, which allows for bidirectional communication via the OPA 112.

The optical tracking module 102 additionally includes one or more processors 114. The one or more processors 114 may be any conventional processors, such as commercially available CPUs. Alternatively, the one or more processors may be a dedicated device such as an application specific integrated circuit (ASIC) or other hardware-based processor, such as a field programmable gate array (FPGA). The one or more processors may be configured to extract signal information of a beam incoming from free space via the OPA and provide drive for controlling a beam outgoing from free space via the OPA.

The optical tracking module 102 additionally includes an analog drive 116. The analog drive 116 may adjust a voltage provided to the one or more phase shifters 113. For example, the analog drive 116 may include one or more biasing means, such as a biasing circuit. The analog drive 116 may adjust the voltage to a set voltage determined by the one or more processors 114. Using the analog drive 116, an outgoing beam may be steered without any physically moving parts. For example, the analog drive 116 may be configured to drive the phase shifters 113 in the OPA 112 to electronically steer the outgoing beam. The electronic steering may be for tip and tilt of the outgoing beam. The set voltage may be determined by the one or more processors according to the extracted signal information, which may be provided in a feedback loop.

The optical tracking module 102 additionally includes a photodetector 118. The photodetector 118 may be one or more photodiodes, photoresistors, phototransistors, or other type of sensor to convert the received light beam, or optical signal, into an electrical signal. In some implementations, the photodetector 118 may be an array of photodetectors. Each photodetector in the array of photodetector may be connected to one of the phase shifters of the plurality of phase shifters 113. The photodetector 118 may be connected to the one or more processors 114, such that the electrical signal generated by the photodetector 118 may be sent to the one or more processors 114. Signal processing components between the photodetector 118 and the one or more processors 114 may further process the generated electrical signal for extracting the signal information. The extracted signal information may include tip and tilt terms, as well as higher order terms associated with a power value, an intensity value, an estimated angle of arrival, or other variations in the incoming beam. Variations in the beam may be caused by environmental disturbances, atmospheric turbulence, or other external factors.

The OPA 112, processor(s) 114, analog drive 116, and photodetector 118 may be an integrated circuit, such as OPA IC 110 in FIG. 1. Alternatively, they may be discrete components that are connected to provide the functions described herein.

In some implementations the optical tracking module may include a voltage regulator. The voltage regulator may be connected to an external power source and/or separate computing device. In other implementations, the optical tracking module may include a thermal management component, such as one or more temperature sensors for detecting temperatures at or near the optical tracking module. As shown in FIGS. 1 and 2, optical tracking module 102 includes a voltage regulator 122 and a temperature sensor 124. The voltage regulator 122 and the temperature sensor 124 are shown in FIG. 1 on the same printed circuit board (PCB) 120 as the OPA IC 110. In other implementations, the voltage regulator and temperature sensor may be on a separate board or other support base than the OPA, processor (s), analog drive, and photodetector. The voltage regulator 122 is connected to an external power source and/or a computing device separate from the optical tracking module 102 via module port 144.

The optical tracking module may optionally include a circulator, such as circulator 130 on optical tracking module 102, or may be connected to an external circulator. The circulator may have a first port configured to receive a signal from a computing device separate from the optical tracking module via a first fiber, a second port configured transmit a signal to and receive a signal from the OPA, and a third port configured to transmit a signal to the separate computing device via a second fiber. As shown in FIG. 1, there may be a fiber input in a first module port 140 that is directed to the first port of the circulator 130, and a fiber output from a second module port 142 is connected to the third port of the circulator 130. The fiber input and fiber output may be connected to a separate computing device, such as a modem.

As shown in FIG. 2, components of the optical tracking module may be divided into a few blocks. The optical tracking module 102, for example, may include a photonics block 202, a transmit/receive block 204, a control block 206, and a digital control interface 208. The photonics block 202 includes at least the OPA 112, phase shifter(s) 113, photodetector 118, and temperature sensor 124. The transmit/receive block 204 comprises a portion of an integrated circuit that processes an incoming or outgoing signal from the photonics block 202. For example, a first signal generated by the photodetector 118 may be directed to a first amplifier 212 and an analog-to-digital converter (ADC) 222 before being directed to the control block 206. A second signal from the control block 206 may be directed to a digital-to-analog converter (DAC) 220 and a second amplifier 210 before being directed to the phase shifter(s) 113. The control block 206 may comprise one or more processors 114, such as a digital signal processor as shown in FIG. 2, another type of integrated circuit, or one or more discrete components. The digital control interface 208 may be a low-speed control digital interface 230 as shown in FIG. 2. The digital control interface 208 may be configured to monitor sensor measurements from the optical tracking module, such as telemetry data, and/or run programming for the optical tracking module, such as initialization or updates.

Figure 3:
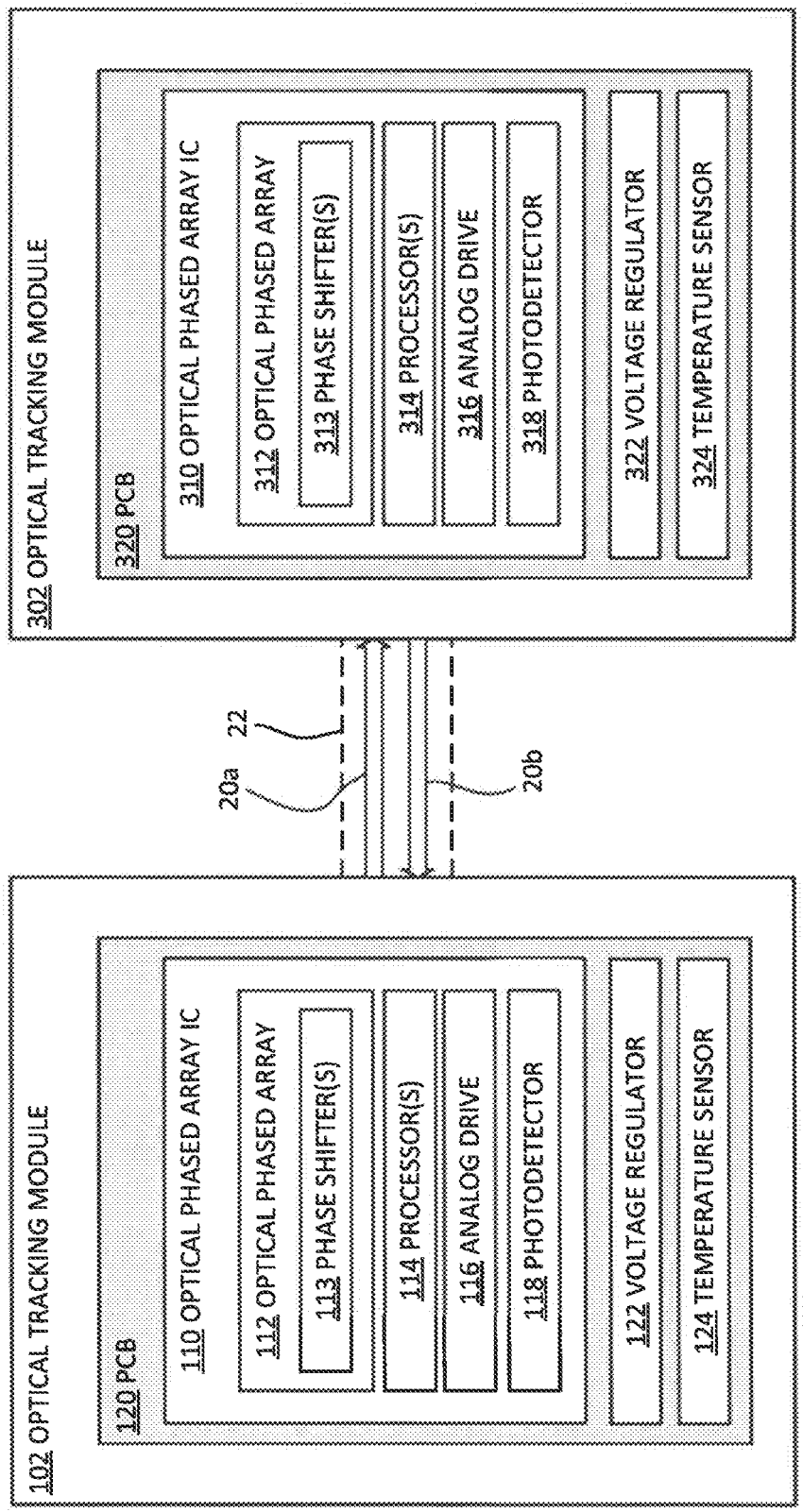
FIG. 3 is a block diagram 300 of a first optical tracking module and a second optical tracking module in accordance with aspects of the disclosure.

FIG. 3 shows the optical tracking module 102 in communication with another optical tracking module 302 via a communication link 22. As depicted, the optical tracking module 102 described herein is capable of transmitting and receiving signals in short-range, high throughput free-space optical communication links without any additional optics or steering components. As shown in FIG. 1, the optical tracking module 102 can function as such when connected to a fiber input, a fiber output, and electrical power. The communication link 22 is shown in FIG. 3 as comprising a first optical beam 20a transmitted by optical tracking module 102 to optical tracking module 302 and a second optical beam 20b transmitted by optical tracking module 302 to optical tracking module 102.

The optical tracking module 302 may be configured the same as or similar to the optical tracking module 102, as described herein. For example, the optical tracking module 302 includes an OPA IC 310 with an OPA 312, phase shifter(s) 313, one or more processors 314, an analog drive 316, and a photodetector 318, which may be comparable to the OPA IC 110, OPA 112, phase shifter(s) 113, one or more processors 114, analog drive 116, and photodetector 118. The optical tracking module 302 may also include a voltage regulator 322 that is same or similar to voltage regulator 122 and a temperature sensor 324 that is same or similar to temperature sensor 124. These components of the optical track module 302 may be positioned on a PCB 320 that is the same or similar to PCB 120. In some implementations, the optical tracking module 302 may also include a circulator in the same or similar manner as circulator 130.

The communication link 22 between the first tracking module 102 and the second tracking module 302 may be formed when the tracking modules are aligned. The alignment can be determined using the optical beams 20a, 20b to determine when line-of-sight is established between the tracking modules 102, 302. Using the communication link 22, the one or more processors 114 can send communication signals using the optical beam 20a to the second tracking module 302 through free space, and the one or more processors 314 can send communication signals using the optical beam 20b to the first tracking module 102 through free space. The communication link 22 between the first and second tracking modules 102, 302 allows for the bi-directional transmission of data between the two tracking modules. In particular, the communication link 22 in these examples may be free-space optical communications (FSOC) links. In other implementations, one or more of the communication links 22 may be radio-frequency communication links or other type of communication link capable of travelling through free space. In some other implementations, the communication link 22 may be unidirectional and/or more than one beam may be transmitted from one optical tracking module to another.

Figure 4A:
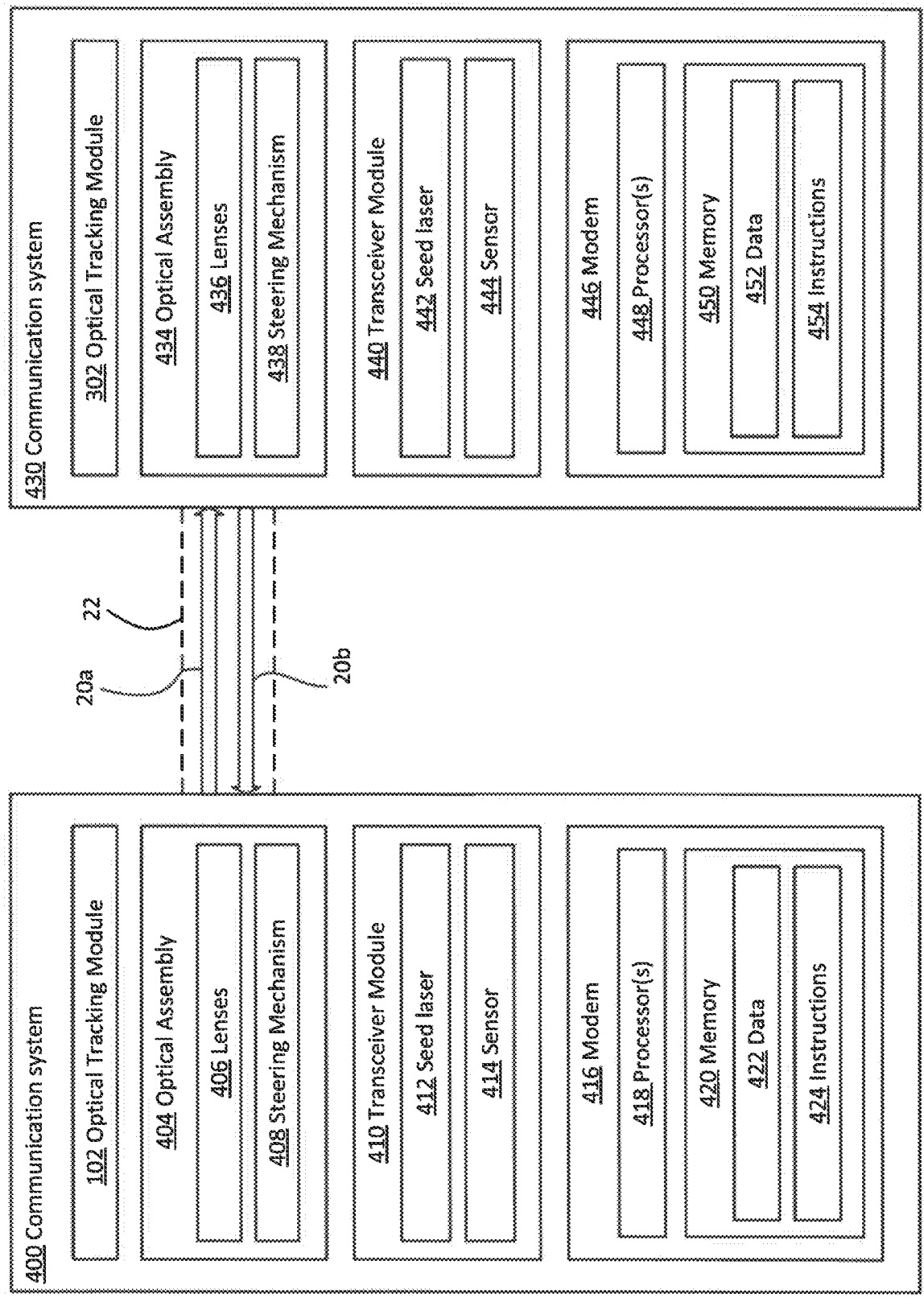
FIG. 4A is a block diagram of a first communication system and a second communication system in accordance with aspects of the disclosure.
Figure 4B:
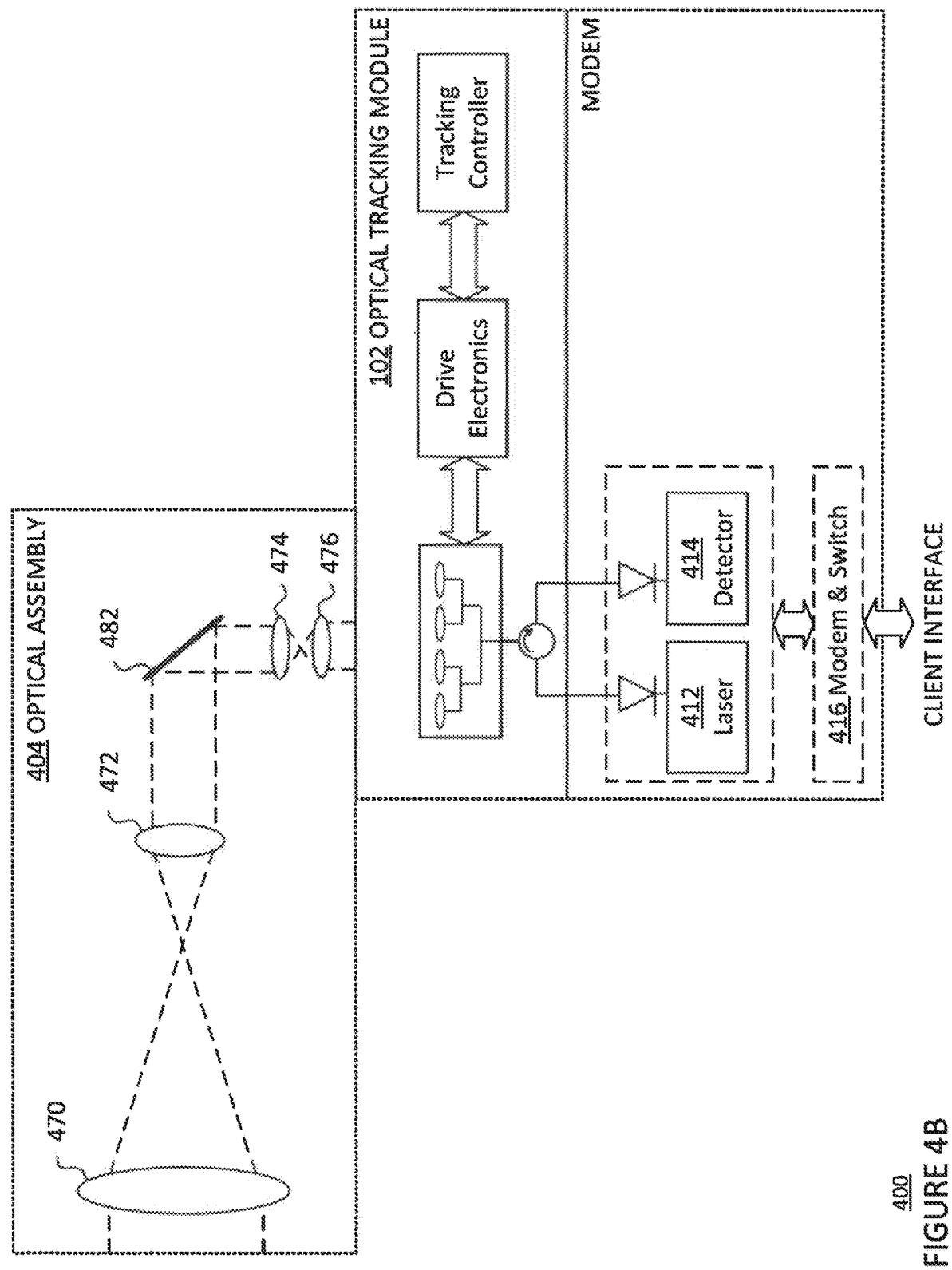
FIG. 4B is a pictorial diagram of a communication system in accordance with aspects of the disclosure.

As shown in FIGS. 4A and 4B, the optical tracking module may additionally or alternatively be used in an overall, modular system architecture for a longer-range optical communication system that includes an optical assembly, a transceiver module, and a modem. This modem may be configured to provide higher transmit and collection power than a modem used for powering the optical tracking module on its own. In FIGS. 4A and 4B, the architecture of the optical communication system 400 is depicted as including optical assembly 404, transceiver module 410, and modem 416. Another optical communication system 430 is depicted in FIG. 4A as including optical assembly 434, transceiver module 440, and modem 446. Optical communication system 400 is shown in communication with the optical communication system 430 via communication link 22.

The optical assembly 404 may include telescope optics to increase aperture gain. For example, the optical communication system 400 includes one or more lenses 406 that form a telescope. The telescope may receive collimated light and output collimated light. The telescope may include an objective portion, an eyepiece portion, or a relay portion. As shown in FIG. 4B, the system may include an objective lens 470, an eyepiece lens 472, and relay lenses 474, 476.

The optical assembly 404 may also include one or more additional steering mechanisms 408, such as an actuated/steering mirror 482, to maintain a target beam-steering range. The actuated/steering mirror 482 may be a MEMS 2-axis mirror, 2-axis voice coil mirror, or a piezoelectronic 2-axis mirror. When the optical assembly 404 is connected with the optical tracking module 102, the one or more processors 114 of the optical tracking module 102 may be configured to adjust a pointing direction and/or wavefront shape of an outgoing beam by controlling the OPA IC 110 and/or the mirror 482. In some examples, the one or more processors 114 may receive and process additional signals from the optical assembly 404, such as from one or more sensors positioned on the optical assembly. In an alternative implementation, one or more additional processors may be dedicated to receiving and controlling the steering mirror of the optical assembly 404. Using the feedback loop, the steering mechanism 408 may be controlled as a fast steering mirror or a coarse pointing mirror.

The transceiver module 410 may include transmitter components, such as a light source for providing an outgoing beam, and receiver components, such as a sensor for processing an incoming beam. As shown in FIGS. 4A and 4B, the transceiver module 410 includes a seed laser 412 and a sensor 414. The seed laser 412 may be a distributed feedback laser (DFB), light-emitting diode (LED), a laser diode, a fiber laser, or a solid-state laser. The light output of the seed laser 412, or optical signal, may be controlled by a current, or electrical signal, applied directly to the seed laser, such as from a modulator that modulates a received electrical signal. Light transmitted from the seed laser 412 is received by the OPA 112. Other transmitter components may include an amplifier, such as a high-power semiconductor optical amplifier.

The receiver components may include at minimum a sensor 414, such as an additional photodetector. In a same or similar manner as photodetector 118, the sensor 414 may convert the received light, or optical signal, into an electrical signal that can be further processed by one or more processors of the optical tracking module, the modem 416, or other part of the communication system 400. Other receiver components may include an attenuator, such as a variable optical attenuator, an amplifier, such as a semiconductor optical amplifier, or a filter.

The transceiver module 410 may include additional photonics, a different combination of photonics, and/or electronic circuitry. The components of the transceiver module may be integrated on a single chip. Alternatively, the transceiver module may comprise more than one chip and/or discrete components. The transceiver module 410 is configured to transmit and receive optical beams via the optical tracking module 102, and also communicate with the modem 416. In some implementations, the transceiver module may be part of an overall modem module.

The modem 416 may include an adaptive rate modem with integrated switching capabilities for traffic aggregation and disaggregation. The components of the modem 416 may be configured to provide physical layer enhancements, as well as digital processing for a communications protocol and switching logic. For example, the components may include an integrated Ethernet switch for aggregating/disaggregating different input/output traffic sources, a framer function to encapsulate the Ethernet packets and other data sources into frames optimized for transmission across a wireless optical link, code rate-selective forward error correction (FEC) encoding/decoding function in which the rate may be selected based on channel conditions, scrambling/unscrambling function for randomization of the data which may provide good DC balance and help clock recovery, an automatic repeat request function for quick recovery of lost packets by using retransmission, a baud rate and/or modulation adaptation based on channel conditions, or logic for point-to-multipoint communication support through scheduler and medium access control. As shown in FIG. 4A, the modem 416 includes one or more processors 418, a memory 420, data 422, and instructions 424.

The one or more processors 418 may be any conventional processors, such as commercially available CPUs. Alternatively, the one or more processors may be a dedicated device such as an application specific integrated circuit (ASIC) or other hardware-based processor, such as a field programmable gate array (FPGA). Although FIG. 4A functionally illustrates the one or more processors 418 and memory 420 as being within the same block, such as in a modem 416, the one or more processors 418 and memory 420 may actually comprise multiple processors and memories that may or may not be stored within the same physical housing, such as in both the modem 416 and a separate processing unit. Accordingly, references to a processor or computer will be understood to include references to a collection of processors or computers or memories that may or may not operate in parallel.

The one or more processors 418 may be in communication with the transceiver module 410. In particular, the one or more processors 418 may be configured to provide instructions to the transceiver module 410 to receive and process incoming optical signals and to transmit optical signals. The one or more processors 418 may therefore be configured to transmit, via the transmitter components, data in a signal, and also may be configured to receive, via the receiver components, communications and data in a signal. The received signal may be processed by the one or more processors 418 to extract the communications and data. In addition or alternatively, the received signal may be processed by the one or more processors 418 to direct the received signal to a next hop or a client interface.

Memory 420 may store information accessible by the one or more processors 418, including data 422, and instructions 424, that may be executed by the one or more processors 418. The memory may be of any type capable of storing information accessible by the processor, including a computer-readable medium such as a hard-drive, memory card, ROM, RAM, DVD or other optical disks, as well as other write-capable and read-only memories. The system and method may include different combinations of the foregoing, whereby different portions of the data 422 and instructions 424 are stored on different types of media.

Data 422 may be retrieved, stored or modified by the one or more processors 418 in accordance with the instructions 424. For instance, although the system and method are not limited by any particular data structure, the data 422 may be stored in computer registers, in a relational database as a table having a plurality of different fields and records, XML documents or flat files. The data 422 may also be formatted in any computer-readable format such as, but not limited to, binary values or Unicode. By further way of example only, image data may be stored as bitmaps comprised of grids of pixels that are stored in accordance with formats that are compressed or uncompressed, lossless (e.g., BMP) or lossy (e.g., JPEG), and bitmap or vector-based (e.g., SVG), as well as computer instructions for drawing graphics. The data 422 may comprise any information sufficient to identify the relevant information, such as numbers, descriptive text, proprietary codes, references to data stored in other areas of the same memory or different memories (including other network locations) or information that is used by a function to calculate the relevant data. In some implementations, the data 422 may include calibration information, such as one or more offsets determined for tracking a signal, communication protocol data, and/or switching logic data.

The instructions 424 may be any set of instructions to be executed directly (such as machine code) or indirectly (such as scripts) by the one or more processors 418. For example, the instructions 424 may be stored as computer code on the computer-readable medium. In that regard, the terms "instructions" and "programs" may be used interchangeably herein. The instructions 424 may be stored in object code format for direct processing by the one or more processors 418, or in any other computer language including scripts or collections of independent source code modules that are interpreted on demand or compiled in advance. Functions, methods and routines of the instructions 424 are explained in more detail below. The instructions may include calibration instructions, communication protocol instructions, and/or switching logic instructions.

The system may include additional components to support functions of the communication terminal. For example, the system may include optical fibers, or waveguides, connecting optical components, creating a path between the transceiver module 410, optical tracking module 102, and optical assembly 404, as well as in the reverse.

As shown in FIG. 4A, the second communication system 430 includes optical tracking module 302, optical assembly 434, transceiver module 440, and modem 446. The optical tracking module 302 may be the same or similar to the optical tracking module 102. Optical assembly 434 may be same or similar to optical assembly 404, such as including one or more lenses 436 and steering mechanism 438 comparable to one or more lenses 406 and steering mechanism 408. Transceiver module 440 may be same or similar to transceiver module 410, such as including seed laser 442 and sensor 444 comparable to seed laser 412 and sensor 414. Modem 446 may be same or similar to modem 416, such as including one or more processors 448, memory 450, data 452, and instructions 454 comparable to one or more processors 418, memory 420, data 422, and 424 instructions. Additional components for supporting functions of the communication system 430 may be included similar to the additional components described above for communication system 400. In addition, the communication system 430 may have a system architecture that is the same or similar to the system architecture of communication system 400 shown in FIG. 4B.

The communication link 22 between the first communication system 400 and the second communication system 430 may be formed when the first and second communication devices are aligned. The alignment can be determined using the optical beams 20a, 20b to determine when line-of-sight is established between the communication systems 400, 430. In particular, there may be a line-of-sight alignment between the optical assembly 404 of the first communication system 400 and the optical assembly 434 of the second communication system 430. Using the communication link 22, the one or more processors 114 and/or 418 can send communication signals using the optical beam 20a to the second communication system 430 through free space, and the one or more processors 314 and/or 448 can send communication signals using the optical beam 20b to the first communication system 400 through free space. The communication link 22 between the first and second communication systems 400, 430 allows for the bi-directional transmission of data between the two systems. In particular, the communication link 22 in these examples may be free-space optical communications (FSOC) links. In other implementations, one or more of the communication links 22 may be radio-frequency communication links or other type of communication link capable of traveling through free space. In some other implementations, the communication 22 may be unidirectional and/or more than one beam may be transmitted from one optical tracking module to another.

Figure 6A:
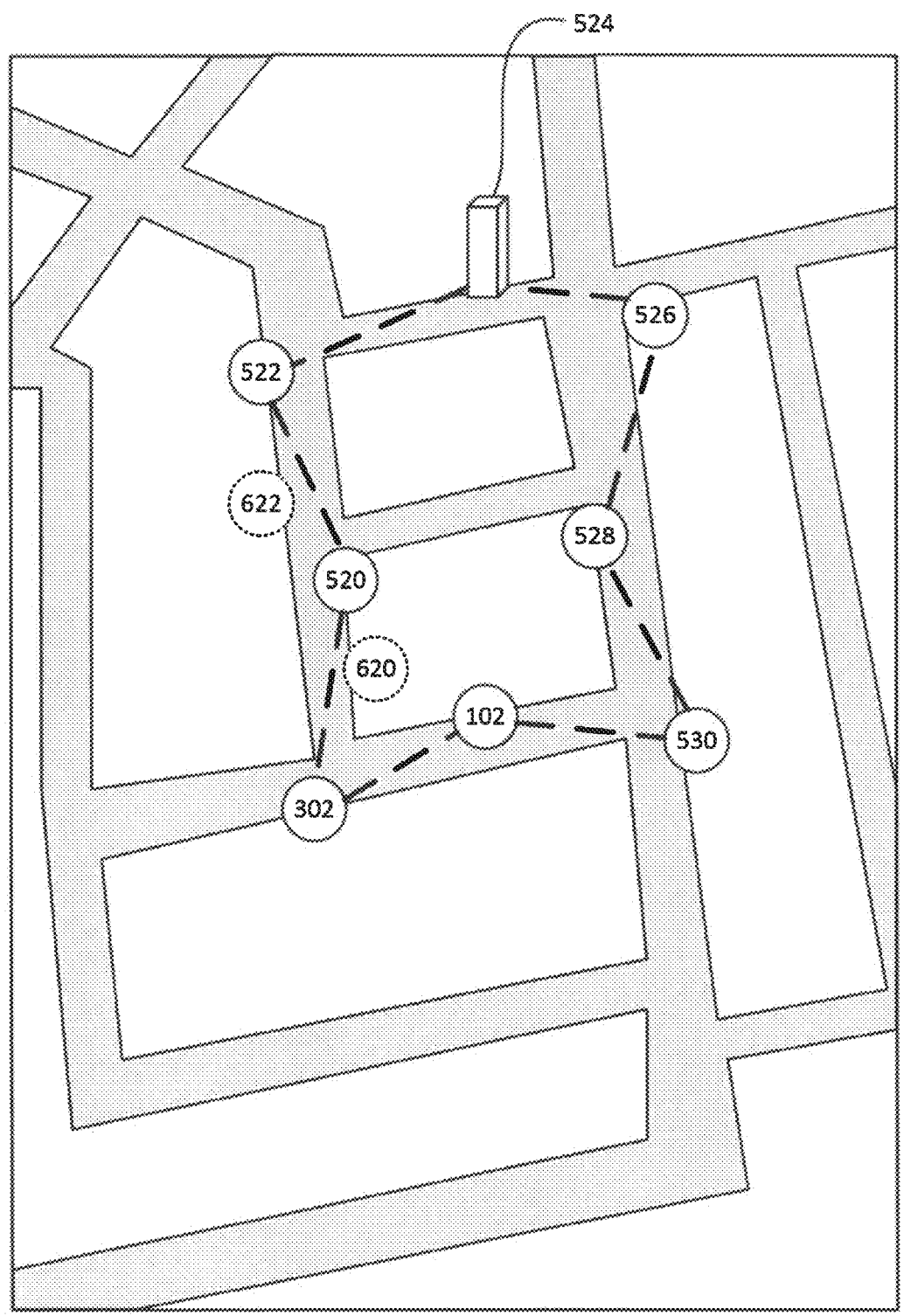
FIGS. 6A and 6B are pictorial diagrams of a portion of a network in accordance with aspects of the disclosure.

FIGS. 5 and 6A show a network portion 500 comprising a plurality of optical tracking modules 102, 302, 520, 522, 524, 526, 528, and 530 as the network nodes or terminals. Optical tracking modules 520, 522, 524, 526, 528, and 530 may be configured in the same or similar configuration as optical tracking modules 102 and 302. The optical tracking modules in the network portion 500 may be in communication with two neighboring nodes, as shown by the arrows in FIG. 5 and the solid lines in FIG. 6A. The optical tracking modules may be in communication with one another via one or more communication links, such as communication link 22 between optical tracking modules 102 and 302. Each of the point-to-point links may be short-range, such as less than or equal to 100 meters, and high throughput, such as 10 Gbps or more, which may provide a higher availability. In other implementations, such as in areas of less demand or lower density, the point-to-point links may have a larger range, such as 500 meters, and a lower throughput, such as 1-10 Gbps.

Network portion 500 is a last-mile topology that comprises a relay of point-to-point links that is configured to distribute data capacity in a "fiber-like" configuration through a geographic area. The optical tracking module 524 may be connected to a backhaul link 546 to provide connectivity to the geographic area served by at least the network portion 500. The network portion 500 may be connected to a larger network, such as the Internet, and may be configured to provide a client device with access to resources stored on or provided through the larger computer network. One or more of the optical tracking modules 102, 302, 520, 522, 524, 526, 528, 530 may be connectable to a remote device directly or via an access point. For example, optical tracking module 102 is directly in communication with client device 540, optical tracking module 520 is directly in communication with a server device 544, and optical tracking module is connected to an access point 542 through which client devices may connect to the network portion 500.

In some implementations, the network portion 500 may serve as an access network for client devices such as cellular phones, laptop computers, desktop computers, wearable devices, tablet computers. In other implementations, the network portion 500 may provide access to server computing devices through the backhaul link 546 or for other devices in the network portion 500.

Figure 6B:
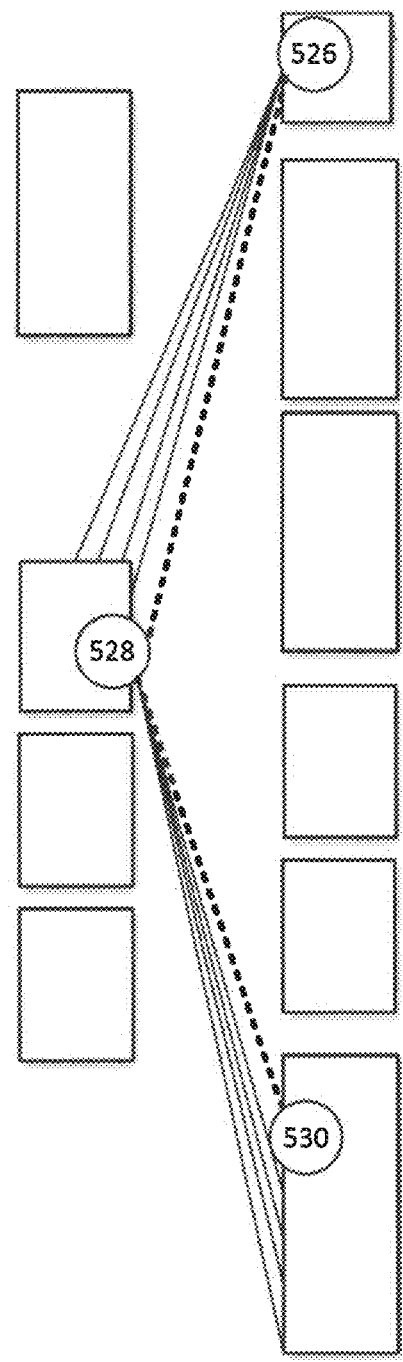

As shown in FIG. 6A, the links may be positioned along roadways, which form natural paths in highly populated areas. These natural paths include unobstructed line-of-sight paths that are needed for effective free-space optical communication. Each of the optical tracking modules 102, 302, 520, 522, 524, 526, 528, 530 are mounted on buildings along the roadways. In other examples, the last-mile topology may include a point-to-multipoint configuration from a transmitting location on a first building to a plurality of receiving locations on one or more buildings across the street from the first building. As shown in FIG. 6B, a point-to-multipoint configuration may be between optical tracking modules 526 and 528 and between optical tracking modules 528 and 530. The one or more processors of optical tracking module 526 may modify the irradiance or phase of one or more phase shifters to form multi-point beam patterns or time division of pointing for the link between optical tracking module 526 and 528. The one or more processors of optical tracking module 528 may modify the irradiance or phase of one or more phase shifters to form multi-point beam patterns or time division of pointing for the link between optical tracking module 528 and 530.

At a building, the network may be extended using intra-building wireless or fiber links. For example, a given optical tracking module in the network portion 500 may be connected by wireless or fiber link to an Ethernet switch, router, or hub for the building on which it is mounted. The switch, router, or hub, may then be connected to intrabuilding nodes and/or access points within the building that are accessible by client devices in the building. The optical tracking module described herein may also be used for such intra-building wireless links or access points. In other implementations, the intrabuilding nodes and/or access points include non-optical communication technologies, such as radio-frequency technologies.

In some examples, additional optical tracking modules may be deployed and added to an existing network, and the existing network may be updated to include the additional optical tracking modules. For example, as shown in FIG. 6A, additional optical tracking modules 620 and 622 may be deployed after the network portion 500 is installed and operational. The optical tracking module 620 is located between optical tracking module 302 and 520, and the optical tracking module 622 is located between optical tracking module 520 and 522. The one or more processors may reconfigure the network to include a link between optical tracking modules 302 and 620, between optical tracking modules 620 and 520, between optical tracking modules 520 and 622, and between optical tracking modules 622 and 522. The links between optical tracking modules 302 and 520 and between optical tracking modules 520 and 522 may be removed, reduced, or maintained. The additional optical tracking modules deployed in the network may increase coverage where additional bandwidth is needed based on population density or usage history. Additionally or alternatively, additional optical tracking modules may be deployed to extend the network portion along roads into previously uncovered geographic regions.

The network portion 500 as shown in FIGS. 5, 6A, and 6B is illustrative only, and in some implementations the network portion 500 may include additional or different communication terminals. For example, in other networks, one or more of the nodes may comprise a communication system such as communication system 400 or 430 of which optical tracking module is a part, or other type of optical terminal. However, using the optical tracking module described herein as a terminal or node in itself without additional optics or steering provides advantages in the last-mile topology of a network over larger or more traditional optical terminals. Namely, the optical tracking module is able to reduce electromagnetic interference and increase ease of scalability.

Example Methods

Figure 7:
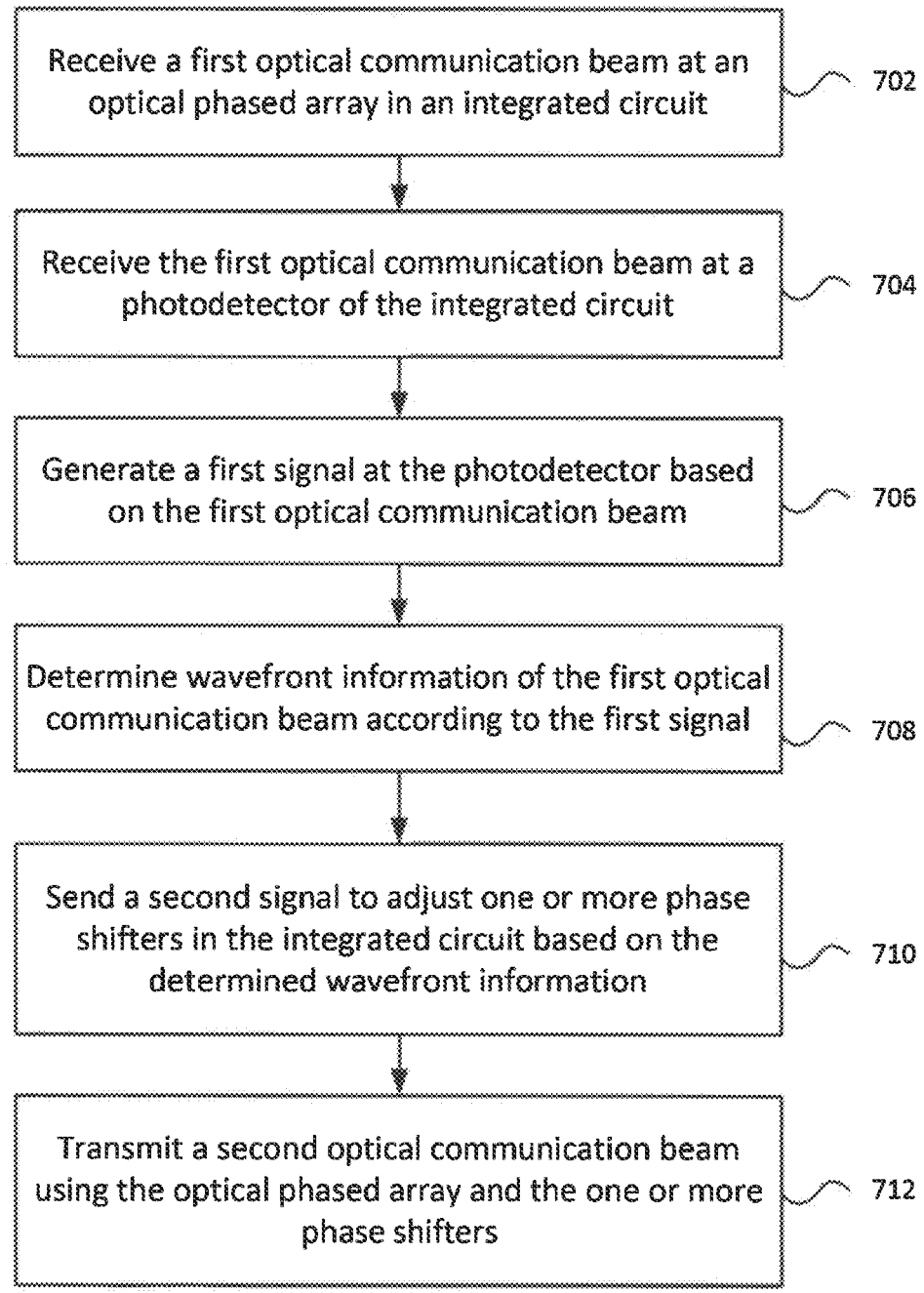
FIG. 7 is a flow diagram in accordance with aspects of the disclosure.

In operation, the one or more processors 114 may control an optical phased array for free-space optical communication. In FIG. 7, flow diagram 700 is shown in accordance with some of the aspects described above that may be performed by the one or more processors 114 of the first optical tracking module 102 and/or one or more processors 314 of the second optical tracking module 302. Additionally or alternatively, one or more steps in the flow diagram 700 may be performed by the one or more processors 418 or 448 of a modem or other dedicated processor that is part of the communication system 400 or 430. While FIG. 7 shows blocks in a particular order, the order may be varied and that multiple operations may be performed simultaneously. Also, operations may be added or omitted.

At block 702, a first optical communication beam is received at an optical phased array in an integrated circuit, such as the OPA IC 110 of optical tracking module 102. The first optical communication beam may carry data from a remote optical terminal or a client device. In particular, the first optical communication beam may be received at a plurality of array elements of the OPA, such as OPA 112, and be directed to a photodetector in the integrated circuit, such as photodetector 118. In some examples, the first optical communication beam is first directed through one or more phase shifters, such as phase shifter(s) 113, before being directed to the photodetector. In some implementations, a beam portion received at a given array element may be directed through at least one phase shifter. At least a portion of each beam portion may be directed to a photodetector. Additionally or alternatively, at least a portion of each beam portion may be coupled to a waveguide, such as via an edge coupler, which directs the collected beam portions to the photodetector. For example, the optical beam 20b may be received at the optical phased array at OPA 112 of optical tracking module 102. The optical beam 20b may be directed through the phase shifters 113 and coupled to a single mode waveguide, which directs the optical beam to photodetector 118.

At block 704, the first optical communication beam is received at a photodetector of the integrated circuit, such as photodetector 118. At block 706, a first signal is generated at the photodetector based on the first optical communication beam. The first signal may be related to a phase, a power, or intensity of the first optical communication beam at the photodetector. In some implementations, the photodetector may generate a signal for different locations of the photodetector, where each location may correspond to or approximate a beam portion received at a given array element of the OPA.

At block 708, one or more processors in the integrated circuit, such as one or more processors 114, determines signal information of the first optical communication beam according to the first signal. The signal information may include phase values of the optical communication beam received at the photodetector. For example, the one or more processors 114 may determine a phase value at various locations on the photodetector 118 based on the signal generated at the photodetector 118. The phase values may be used by the one or more processors to determine a phase front of the first optical communication beam. Determining the phase front may include detecting phase shift settings for each phase shifter. Alternatively, the signal information may include a power value or an intensity value of the optical communication beam received at the photodetector. Based on the signal information, the one or more processors 114 may determine an angle of arrival of the first optical communication beam. The angle of arrival may be determined in terms that include tip, tilt, or higher order terms. Additionally or alternatively, the one or more processors 114 may determine an amount of power at received at the photodetector, which may be related to an amount of out-of-phase beam portion.

At block 710, the one or more processors send a second signal to adjust one or more phase shifters in the integrated circuit, such as phase shifter(s) 113, based on the determined signal information. For example, the signal information may indicate that there is a wavefront error that reduces the coupling efficiency of the first communication beam received at the OPA 112, which may also affect the coupling efficiency of a second communication beam transmitted from the OPA 112 to the remote optical terminal. The one or more processors 114 may then send the second signal to adjust the one or more phase shifters 113. The adjustment may correspond to the tip, tilt, and/or higher order terms determined for an angle of arrival of the first optical communication beam. In some implementations, the adjustment may improve the coupling by causing the in-phase portion of an output beam at a given combiner to increase while causing the out-of-phase portion of the output beam to decrease at a given combiner. The closer the out-of-phase portion of the output beam is to zero intensity, the better the coupling is to the in-phase portion of the output beam, and thus to the rest of the receive path.

Alternatively, the adjustment may correspond with the difference between the location of highest power or intensity of the first optical communication beam on the photodetector 118 and the location of the zero point of the photodetector 118. The second signal may be sent to an analog drive of the integrated circuit, such as analog drive 116, which may in turn apply a drive to adjust the one or more phase shifters. The drive may include applying a different amount of voltage or current to adjust a phase shifter, or may use another biasing means.

At block 712, the one or more processors may transmit a second optical communication beam using the OPA and the one or more phase shifters. For example, the one or more processors 114 may transmit an optical beam 20a using the OPA 112 and the phase shifters 113 of the OPA IC 110 after the phase shifters 113 have been adjusted by the analog drive 116. The pre-distortion of the wavefront and the pointing direction, based on the locally adjusted phase shifters, may enable maximizing the power coupling in the reverse direction across a communication link because of the reciprocity of beam propagation through the atmosphere. In some implementations, the second optical communication beam may be transmitted while one or more of the other steps described in this example method is performed.

The blocks shown in FIG. 7 may comprise a feedback loop for tracking changes of one or more received optical communication beams at the optical tracking module 102. Changes may include position changes, such as drift, fading or scintillation, such as those due to atmospheric disturbances, or other types of changes. Additionally or alternatively, the feedback loop may be repeated to minimize the power measured in the out-of-phase portion received at the photodetector. The feedback loop may include making phase shifter adjustments at each cycle.

The features described herein enables efficient distribution of a large network capacity into the "last mile" of connectivity, which overcomes the capacity bottlenecks that typically limit radio-frequency wireless distribution and the cost of fixed fiber infrastructures. The use of the optical tracking module in a short-range, point-to-point relay arrangement may avoid logistical issues common to deploying fiber, reduce the interference between links, and allow for higher throughput. The compact size of the optical tracking module may allow for less costly and more rapid deployment, as well as allow for ease of adjustment or update to the position of the optical tracking module. Given the characteristics of the output from the optical tracking module described herein, the links in a short-range arrangement may be more robust to motion of a mounting structure or to environmental factors.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. An optical tracking module comprising:
   an optical phased array (OPA) including:
      a plurality of array elements, and
      a plurality of phase shifters;
   an analog drive configured to adjust the plurality of phase shifters;
   an integrated photodetector configured to receive light from the OPA; and
   one or more processors configured to:
      extract signal information of an incoming beam via the OPA, and
      control an outgoing beam using the analog drive based on the signal information; and
   wherein the OPA, the analog drive, the integrated photodetector and the one or more processors are in an integrated circuit.

2. The optical tracking module of claim 1, wherein the optical tracking module is configured to connect to a modem via one or more fibers.

3. The optical tracking module of claim 2, further comprising a circulator that includes a first port configured to receive a signal from a first fiber, a second port configured to transmit a signal to and receive a signal from the integrated circuit, and a third port configured to transmit a signal to a second fiber.

4. The optical tracking module of claim 1, further comprising a voltage regulator.

5. The optical tracking module of claim 4, wherein the voltage regulator is configured to provide power to the integrated circuit.

6. The optical tracking module of claim 1, wherein the optical tracking module is configured to communicate telemetry data to one or more separate processors that are external to the optical tracking module.

7. The optical tracking module of claim 1, wherein the optical tracking module is configured to connect to a separate optical lens assembly that increases aperture gain.

8. The optical tracking module of claim 7, wherein the optical tracking module is configured to connect to a separate transceiver module that includes one or more transceivers and one or more amplifiers.

9. The optical tracking module of claim 1, wherein the optical tracking module is less than 1000 $cm^3$ in volume.

10. The optical tracking module of claim 9, wherein the optical tracking module is less than 100 $cm^2$ in surface area on any face.

11. The optical tracking module of claim 1, wherein the plurality of array elements is in a 32×32 arrangement.

12. The optical tracking module of claim 1, wherein the analog drive includes a digital-to-analog converter (DAC) and an amplifier;
   wherein the one or more processors are connected to the DAC;

wherein the DAC is also connected to the amplifier; and
wherein the amplifier is also connected to the OPA.

13. The optical tracking module of claim 1, wherein the integrated photodetector is connected to the one or more processors via an amplifier and an analog-to-digital converter (ADC).

14. A system comprising:
  a plurality of communication terminals in a network arrangement including a plurality of point-to-point relay links; and
  wherein each of the plurality of communication terminals includes an optical tracking module that has:
    an optical phased array (OPA) including:
      a plurality of array elements, and
      a plurality of phase shifters;
    an analog drive configured to adjust the plurality of phase shifters;
    an integrated photodetector configured to receive light from the OPA; and
    one or more processors configured to:
      extract signal information of an incoming beam via the OPA, and
      control an outgoing beam using the analog drive based on the signal information; and
  wherein each of the plurality of communication terminals is lensless apart from the OPA.

15. The system of claim 14, wherein each communication terminal of the plurality of communication terminals is positioned 100 meters or less from another communication terminal of the plurality of communication terminals; and
wherein each communication terminal of the plurality of communication terminals has at least 10 Gbps throughput to another communication terminal of the plurality of communication terminal.

16. The system of claim 14, wherein the network arrangement also includes one or more point-to-multipoint links.

17. The system of claim 14, wherein the network arrangement at least partially includes a mesh arrangement.

18. The system of claim 14, wherein the network arrangement at least partially includes a ring arrangement.

19. The system of claim 14, wherein the plurality of point-to-point relay links includes at least one inter-building link.

20. A method for controlling an optical phased array, the method comprising:
  receiving a first optical communication beam at the optical phased array in an integrated circuit;
  receiving the first optical communication beam at a photodetector in the integrated circuit;
  generating, at the photodetector, a first signal based on the first optical communication beam;
  determining, by one or more processors in the integrated circuit, signal information of the first optical communication beam according to the first signal;
  sending, by the one or more processors, a second signal to adjust one or more phase shifters in the integrated circuit based on the determined signal information; and
  transmitting a second optical communication beam using the optical phased array and the one or more phase shifters.

* * * * *